United States Patent
Vishik et al.

(10) Patent No.: US 12,124,616 B2
(45) Date of Patent: Oct. 22, 2024

(54) ENHANCEMENT OF TRUSTWORTHINESS OF ARTIFICIAL INTELLIGENCE SYSTEMS THROUGH DATA QUALITY ASSESSMENT

(71) Applicant: Intel Corporation, Santa Clara, CA (US)

(72) Inventors: Claire Vishik, Austin, TX (US);
Reshma Lal, Portland, OR (US);
Santosh Ghosh, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 169 days.

(21) Appl. No.: 17/830,225

(22) Filed: Jun. 1, 2022

(65) Prior Publication Data

US 2022/0300617 A1    Sep. 22, 2022

(51) Int. Cl.
*G06F 21/64*      (2013.01)
*G06F 16/14*      (2019.01)
*G06F 21/60*      (2013.01)

(52) U.S. Cl.
CPC ............ *G06F 21/64* (2013.01); *G06F 21/602* (2013.01); *G06F 16/152* (2019.01)

(58) Field of Classification Search
CPC ...... G06F 21/602; G06F 21/64; G06F 16/285; G06F 16/152; G06F 21/6236; G06F 16/25; G06F 16/906; G06F 16/908; G06F 16/907; G06F 16/90; H04L 9/3247; H04L 63/126; G06N 20/00; G06N 3/08; G06N 3/02; G06N 3/00

See application file for complete search history.

(56) References Cited

U.S. PATENT DOCUMENTS

| | | | |
|---|---|---|---|
| 2016/0179905 A1* | 6/2016 | Gibbons | G06F 16/25 707/737 |
| 2018/0324176 A1* | 11/2018 | Campagna | H04L 63/0435 |
| 2019/0318013 A1* | 10/2019 | Leka | G06F 16/2457 |
| 2020/0313903 A1* | 10/2020 | Yu | H04L 63/123 |
| 2023/0403164 A1* | 12/2023 | Suzuki | H04L 9/3263 |

FOREIGN PATENT DOCUMENTS

EP      3686750 A1 *    7/2020  ........... G06F 16/214

* cited by examiner

*Primary Examiner* — Ali S Abyaneh
*Assistant Examiner* — Brandon Binczak
(74) *Attorney, Agent, or Firm* — JAFFERY WATSON MENDONSA & HAMILTON LLP

(57) ABSTRACT

A system and method of enhancing the trustworthiness of an artificial intelligence system include detecting whether a data element includes an existing data domain tag, processing the data element into a transformed data element, generating a data domain tag, where the data domain tag includes at least a data domain identifier and a timestamp, appending the data domain tag to the transformed data element, creating a signature for the transformed data element and the appended data domain tag using a private key, and creating another signature for the data domain tag using the private key.

20 Claims, 10 Drawing Sheets

ENHANCEMENT OF TRUSTWORTHINESS OF ARTIFICIAL INTELLIGENCE SYSTEMS THROUGH DATA QUALITY ASSESSMENT

FIELD

Embodiments relate generally to computer security, and more particularly, to the enhancement of the trustworthiness of artificial intelligence (AI) systems through data quality assessment based on data provenance and data movement.

BACKGROUND

Typically, a huge amount of data is used in AI. The success of AI is determined by the accuracy of the AI model, which in turn relies heavily on the quality of data used in training. The vast amount of data used in AI training, for example, may have been collected in different places and may have moved around, such as from edge to cloud, making it difficult to have confidence in the quality of data when it is consumed. Numerous techniques can be used to support clarity about data, but they are specific to data types and can increase the size of the data, making it infeasible for broad deployment for AI usage where the data is heterogenous. As such, current techniques are inefficient and time and resource intensive.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Implementations of the technology described herein provide a method and system for the enhancement of the trustworthiness of artificial intelligence (AI) systems through data quality assessment based on data provenance and data movement.

Typically, a huge amount of data is used in AI. The success of AI is determined by the accuracy of the AI model, which in turn relies heavily on the quality of data used in training. The vast amount of data used in AI training, for example, may have been collected in different places and may have moved around, such as from edge to cloud, making it difficult to have confidence in the quality of data when it is consumed. Numerous techniques can be used to support clarity about data, but they are specific to data types and can increase the size of the data, making it infeasible for broad deployment for AI usage where the data is heterogenous.

The novel technology described herein facilitates establishing data lineage including data provenance and data movement. By establishing data lineage, the confidence of an AI model may be enhanced and cyber issues such as feel fakes and software attacks may be prevented. In one example, data provenance facilitates the understanding of data origination and the processes and methodologies that may have been applied to create the data. In one example, data movement refers to the node, domain, device, and the like that the data has traversed through and the processing and transformation that has been applied to it. As such, data provenance and data movement may be used to determine the trustworthiness of an AI system that relies on this data.

Embodiments may be employed for enhancing the trustworthiness of AI models by providing a light weight, low cost, efficient method and system for assessing data quality. For example, data may pass through a variety of sources where it gets modified and/or transformed before it is received by a data consumer (e.g., an AI system). In this regard, the novel technology described herein implements a tagging protocol to facilitate a confidence score of the trustworthiness and/or quality of the data. Furthermore, the integrity of the tagging protocol is verified by the novel methods and systems described herein. The novel technology may be applied to a range of data sets including at least sensor feeds, man-made reports, files, images, and the like. In some examples, data privacy may be preserved by utilizing privacy preserving techniques such as privacy preserving machine learning (PPML), homomorphic encryption, and confidential computing.

Figure 1:
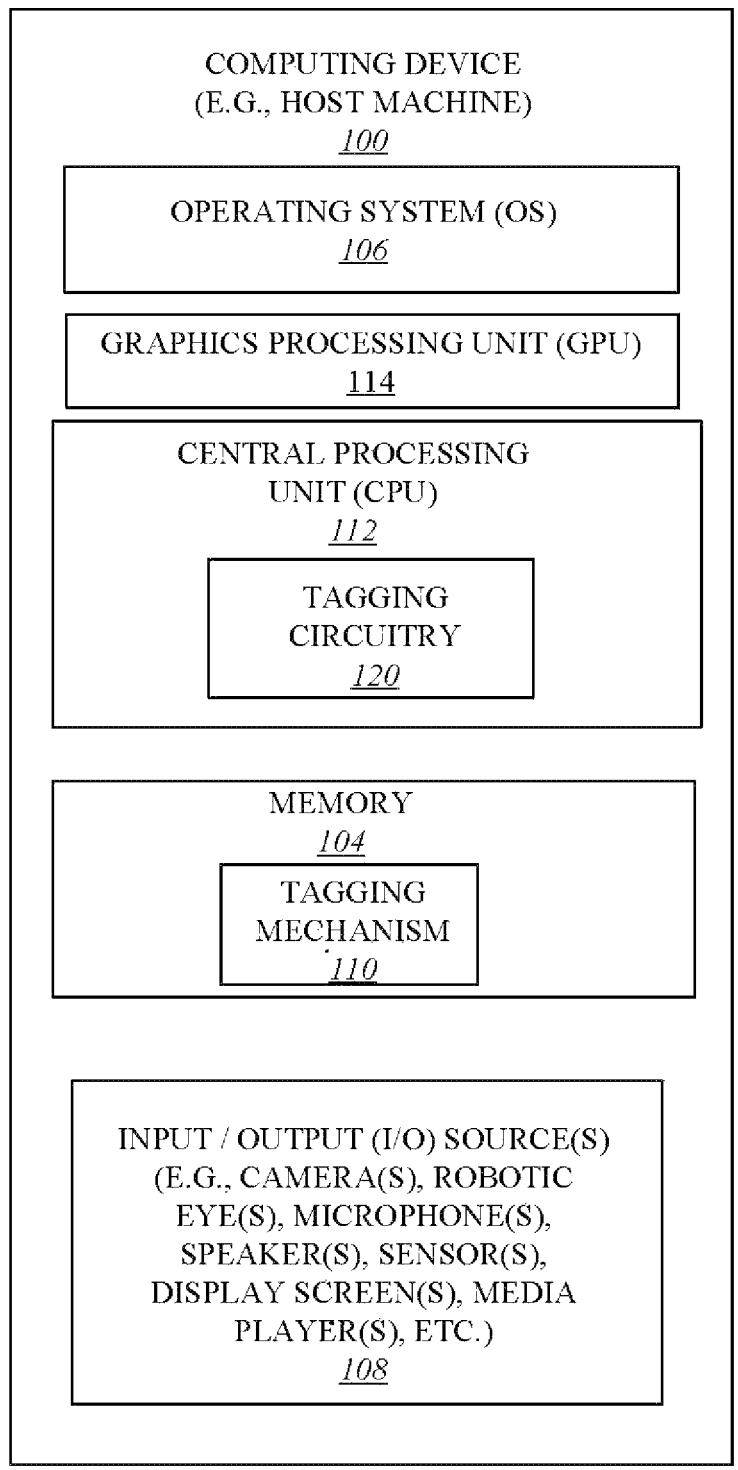
FIG. 1 illustrates a computing device employing a tagging mechanism according to some embodiments.

FIG. 1 illustrates a computing device 100 employing a tagging mechanism 110 according to one embodiment. Computing device 100 represents a communication and data processing device including or representing (without limitation) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted displays (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limited to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip. For example, computing device 100 comprises a data processing device having one or more processors including (but not limited to) central processing unit 112 and graphics processing unit 114 that are co-located on a common semiconductor package.

As illustrated, in one embodiment, computing device 100 may include any number and type of hardware and/or software components, such as (without limitation) graphics processing unit ("GPU" or simply "graphics processor") 114, central processing unit ("CPU" or simply "application processor") 112, memory 104, network devices, drivers, and/or the like, as well as input/output (I/O) source(s) 108, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be preferred for certain implementations. Therefore, any configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). Terms like "logic", "module", "component", "engine", "circuitry", "element", and "mechanism" may include, by way of example, software, hardware, firmware, and/or a combination thereof.

Figure 2:
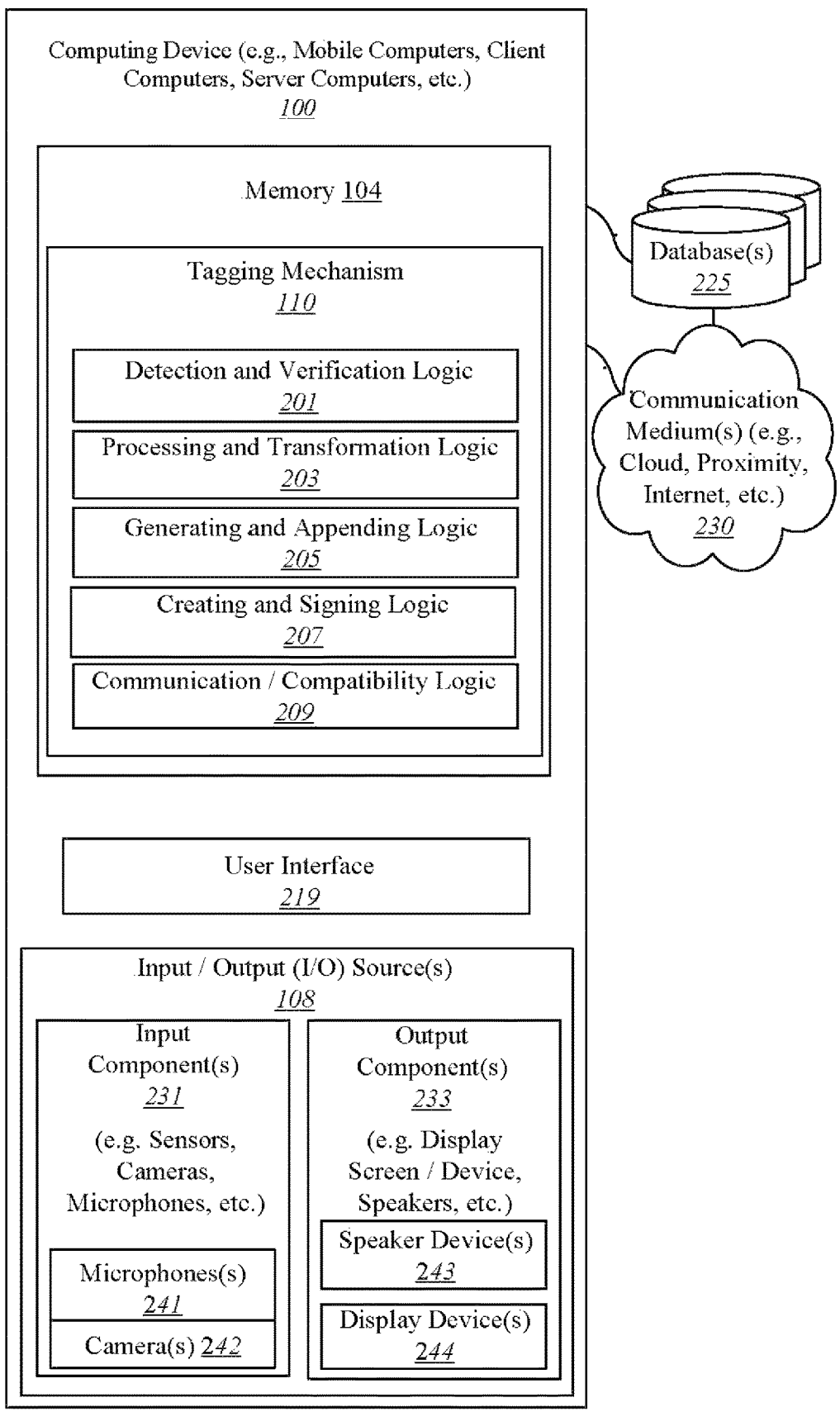
FIG. 2 illustrates the tagging mechanism of FIG. 1 according to some embodiments.
Figure 8A:
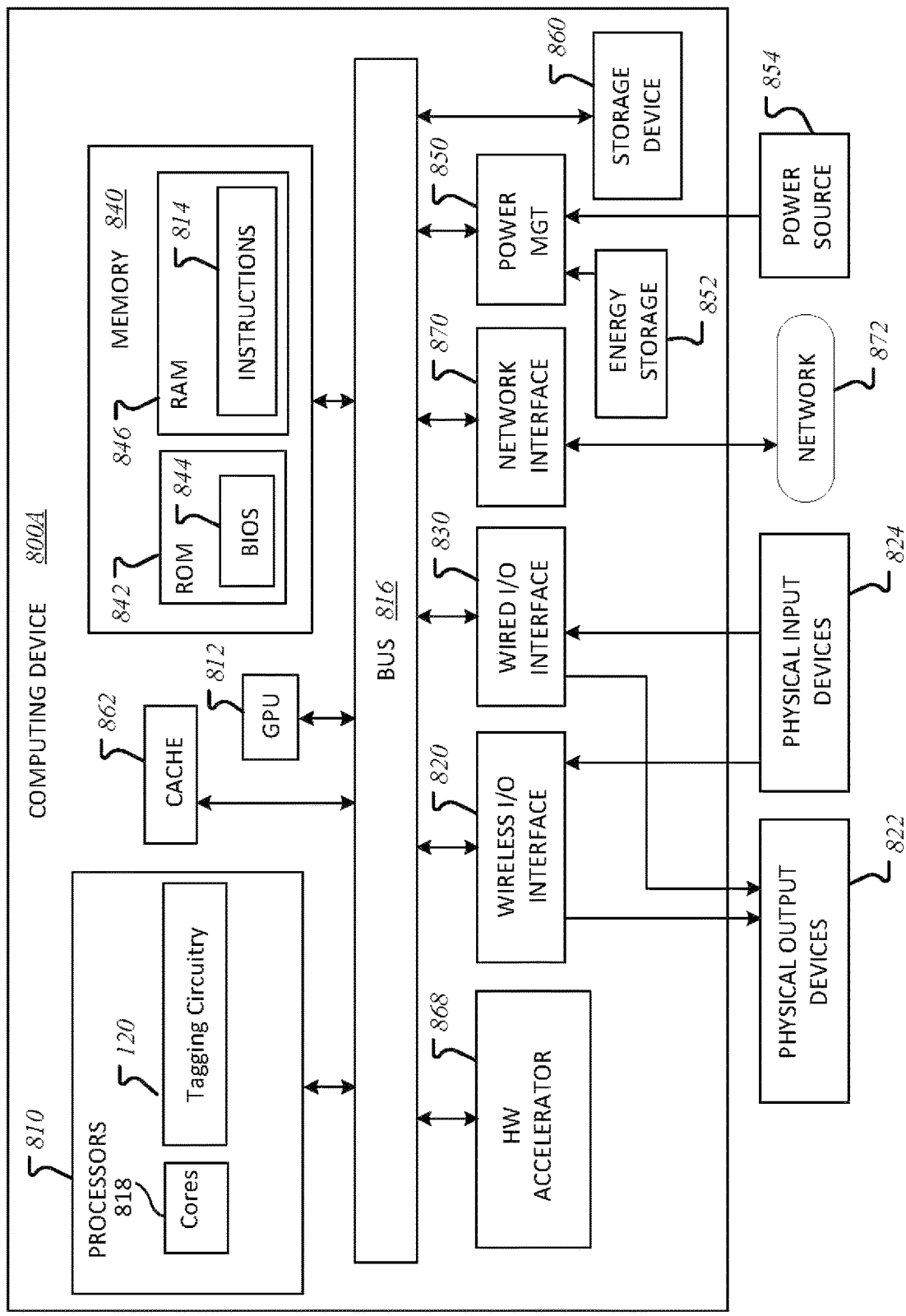
FIG. 8A is a schematic diagram of an illustrative electronic computing device to enhance the trustworthiness of artificial intelligence processing according to some embodiments.

In one embodiment, as illustrated, the tagging mechanism 110 may be hosted by memory 104 (e.g., in the form of instructions stored in memory 104 as shown in FIG. 2) in communication with I/O source(s) 108, such as sensors, microphones, speakers, etc., of computing device 100. In another embodiment, tagging mechanism 110 may be part of or hosted by operating system 106. Similarly, in yet another embodiment, tagging mechanism 110 may be hosted by or part of central processing unit ("CPU" or simply "application processor") 112 in the form of tagging circuitry 120 as shown in the processor of FIG. 8A.

For example, tagging circuitry 120 and/or any elements of tagging mechanism 110 may be implemented by one or more analog or digital circuits, logic circuits, programmable processors, programmable controllers, GPUs, digital signal processors (DSPs), application specific integrated circuits (ASICs), programmable logic devices (PLDs), and/or field programmable logic devices (FPLDs).

It is contemplated that this novel technique is not limited to a software implementation or a hardware implementation and, as will be further described in this document, this novel technique may be applied and implemented in software, hardware, firmware, or any combination thereof. It is, therefore, further contemplated that embodiments are not limited to certain implementation or hosting of tagging mechanism 110 and that one or more portions or components of tagging mechanism 110 may be employed or implemented as hardware, software, firmware, or any combination thereof. Further, as used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events Computing device 100 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, a data processing machine, a data processing device, network of computers, or other electronic devices, may result in the one or more machines carrying out operations in accordance with embodiments described herein. As described with reference to FIG. 1, a machine may include one or more processors, such as a CPU, a GPU, etc. A machine-readable medium may include, but is not limited to, floppy diskettes, optical disks, Compact Disc-Read Only Memories (CD-ROMs), magneto-optical disks, ROMs, Random Access Memories (RAMs), Erasable Programmable Read Only Memories (EPROMs), Electrically Erasable Programmable Read Only Memories (EEPROMs), magnetic or optical cards, flash memory, or other type of media/machine-readable medium suitable for storing machine-executable instructions.

For example, when reading any of the apparatus, method, or system claims of this disclosure to cover a purely software and/or firmware implementation, at least one element of tagging circuitry 120 and/or tagging mechanism 110 may be expressly defined to include a non-transitory computer readable storage device or storage disk such as a memory, a digital versatile disk (DVD), a compact disk (CD), a Blu-ray disk, etc., including the software and/or firmware.

Moreover, one or more elements of tagging circuitry 120 or tagging mechanism 110 may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout this document, the term "user" may be interchangeably referred to as "viewer", "observer", "speaker", "person", "individual", "end-user", "developer", "programmer", "administrators", and/or the like. For example, in some cases, a user may refer to an end-user, such as a consumer accessing a client computing device, while, in some other cases, a user may include a developer, a programmer, a system administrator, etc., accessing a workstation serving as a client computing device. It is to be noted that throughout this document, terms like "graphics domain" may be referenced interchangeably with "graphics processing unit", "graphics processor", or simply "GPU"; similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

FIG. 2 illustrates tagging mechanism 110 of FIG. 1 according to some embodiments. For brevity, many of the details already discussed with reference to FIG. 1 are not repeated or discussed hereafter. In one embodiment, tagging mechanism 110 may include any number and type of elements or components, such as (but not limited to): detection and verification logic 201; processing and transformation logic 203; generating and appending logic 205; creating and signing logic 207; and communication/compatibility logic 209.

Computing device 100 further includes user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having input component(s) 231, such as camera(s) 242 (e.g., Intel® RealSense™ camera), microphone(s) 241, sensors, detectors, keyboards, mice, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, an intranet, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O source(s) 108 including input component(s) 231 and output component(s) 233. In one embodiment, input component(s) 231 may include a sensor array including, but not limited to, microphone(s) 241, camera(s) 242, capacitors, radio components, radar components, scanners (e.g., fingerprint scanners), and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software, hardware, firmware, and/or any combination thereof. For example, logic may itself include or be associated with circuitry at one or more devices, such as tagging circuitry 120 hosted by the CPU 112, respectively, of FIG. 1 having to facilitate or execute the corresponding logic to perform certain tasks.

Embodiments provide for a novel technique, as facilitated by tagging mechanism 110 for enhancing the trustworthiness of AI systems through data quality assessment. Data may be tracked as it is moved from various nodes (e.g., editing or display points) associated with one or more data domains. A data domain may include a set of properties, attributes and/or characteristics that help define its trustworthiness regarding data quality. A data domain may be defined by data centers, organizations, device types, individual devices, and the like. For example, a data domain may be defined by devices belonging to a reputable service such as cloud sourcing by Google. In another example, a data domain may be defined by devices with hardware (HW) security features such as Trusted Execution Environment like Intel Software Guard Extensions (SGX) or Intel Trust Domain Extensions (TDX). In this regard, a data domain may include one or more domain member devices.

Figure 3A:
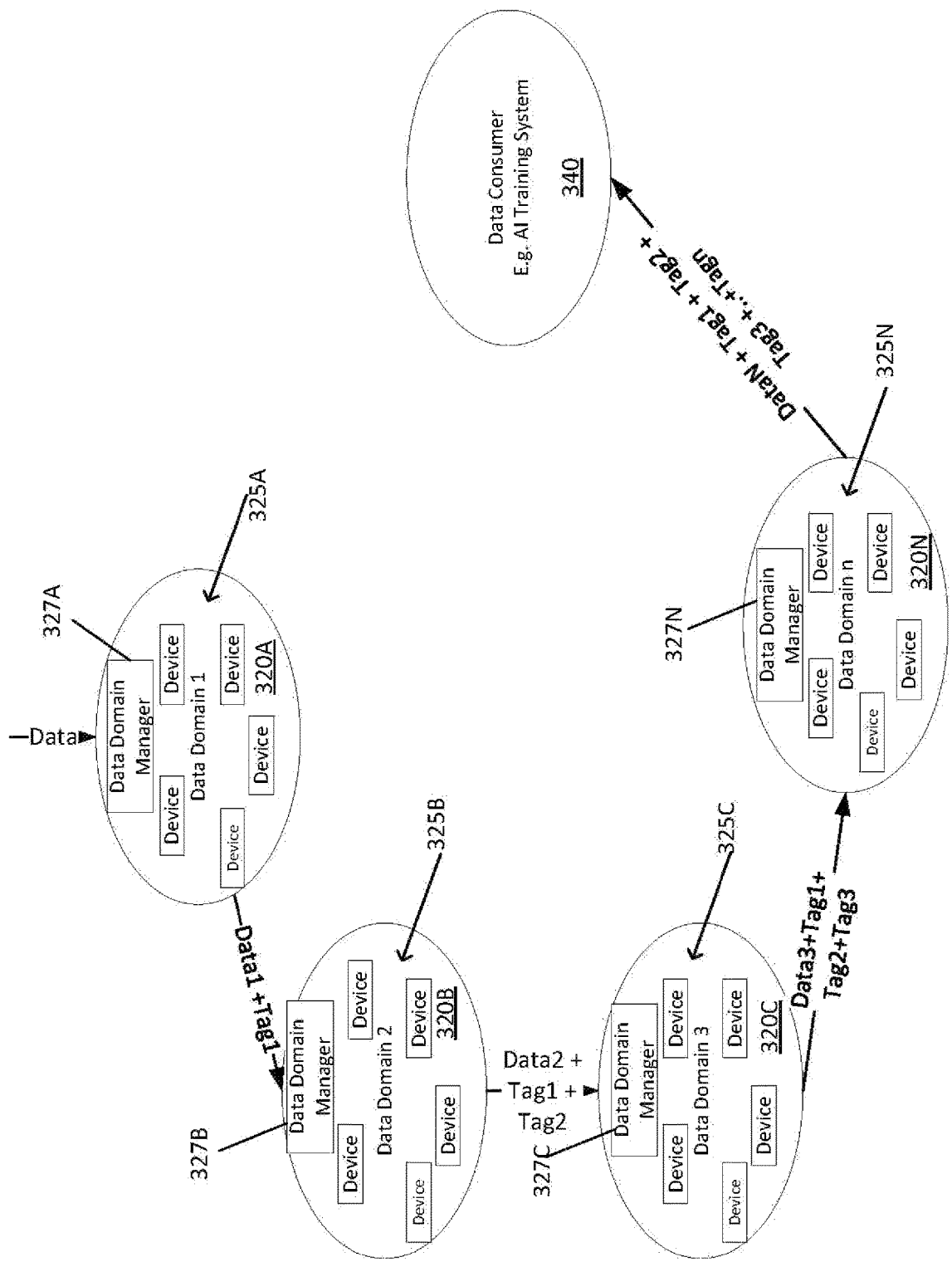
FIG. 3A illustrates an exemplary tagging protocol according to some embodiments.

With reference now to FIG. 3A, the data may pass through one or more domain member devices 325A-325N and/or one or more data domains 320A-320N. As shown, the domain member devices 325A are associated with data domain 320A, the domain member devices 325B are associated with data domain 320B, the domain member devices 325C are associated with data domain 320C, the domain member devices 325N are associated with data domain 320N. Each data domain of the one or more data domains 320A-320N may have a unique data domain identifier. In one example, the unique data domain identifier may be like an internet protocol (IP) address. In one example, the data domain identifiers may be stored in a private database. In another example, the data domain identifiers may be stored in a public database. In this regard, a request for the trustworthiness of a data domain may be sent to the public database and/or private database. The response to the request may include at least one of a yes/no answer, a level of confidence regarding the trustworthiness, and attributes associated with the data domain such that the requester can determine the level of trustworthiness.

Each data domain of the one or more data domains 320A-320N may be registered in a global repository. In some example, the attributes, properties, and/or characteristics of the data domains 320A-320N may be registered and/or stored in the global repository. In this regard, the data domains 320A-320N may have one or more distinct trust properties. The one or more distinct trust properties may include properties associated with a data domain that indicate a trustworthiness of the data domain. The attributes, properties, and/or characteristics of the data domains 320A-320N may be used to rank the data domains 320A-320N by their level of trustworthiness. As data traverses through more than one data domain where it is processed and/or transformed, the tagging protocols described herein provide data provenance and data movement information to assess the data quality. As illustrated in FIG. 3A, as data is transmitted from the data domain 320A to the data domain 320B, a data domain tag is appended to the data (e.g., Data1+Tag1). As data is transmitted from the data domain 320B to the data domain 320C, a second data domain tag is appended to the transformed data (e.g., Data2) and the previous data domain tag (e.g., Data 2+Tag1+Tag2). As data is transmitted from the data domain 320C to the data domain 320N, a third data domain tag is appended to the transformed data (e.g., Data3) and the previous data domain tags (e.g., Data 3+Tag1+Tag2+Tag3), and so on. In this regard, as data traverses multiple data domains where the data is processed and/or transformed, the tags from each data domain (e.g., each data domain tag) may be concatenated while preserving the integrity of the previous tags.

In one embodiment, with reference again to FIG. 2, detection and verification logic 201 detects whether a data element includes an existing data domain tag. The data element may include any data type utilized to train a system and/or model such as an AI system and/or where the quality and/or trustworthiness of the data is assessed. In one example, the data element may generally refer to data, as described herein, and may include at least one of a file, picture/image, sensor data, and the like. The existing data domain tag may encapsulate minimal information of the data domain. For example, the data domain tag may encapsulate information such as where the data element was created, the data domain identifier, and a time stamp of when the data element was processed by a domain member device (e.g., such domain member devices 325A-325N). In other examples, the data domain tag may include additional metadata associated with the data domain.

When the existing data domain tag is detected, detection and verification logic 201 verifies cryptographic binding between the data element and the existing data domain tag. In one embodiment, cryptographic protection may be activated by default. In other embodiments, an option for activating cryptographic protection may be available. As such, security threats such as tag spoofing or tampering are prevented. In one example, detection and verification logic 201 verifies cryptographic binding between the data element and the existing data domain tag using a public key. With reference again to FIG. 3A, the data domains 320A-320N may include data domain managers 327A-327N, respectively. Each data domain manager of the data domain managers 327A-327N may generate a global public key for its respective data domain. The global public key may be used to determine trustworthiness of the data/data element.

In one example, processing and transformation logic 203 processes data and/or a data element as it is created, modified, edited, and the like into a transformed data element. The transformed data element represents a data element processed by a domain member device. After the data element is processed, generating and appending logic 205 generates a data domain tag. As discussed above, the data domain tag may include at least a data domain identifier and a timestamp. The data domain tag may include additional metadata about the data domain in which the data is being processed. In one example, the data domain tag may include a tagging scheme that is independent of data type, data size, and data format. The data domain tag may be defined by a standard schema such as Software Bill of Materials (SBOM). In other examples, generating and appending logic 205 appends the data domain tag to the transformed data element.

In one example, creating and signing logic 207 creates a signature for the transformed data element and the appended data domain tag using a private key. Each data domain manager of the data domain managers 327A-327N may generate a private key for each of the domain member devices 325A-325N. In another example, creating and signing logic 207 creates a signature for the data domain tag using the private key of its respective domain member device.

Figure 3B:
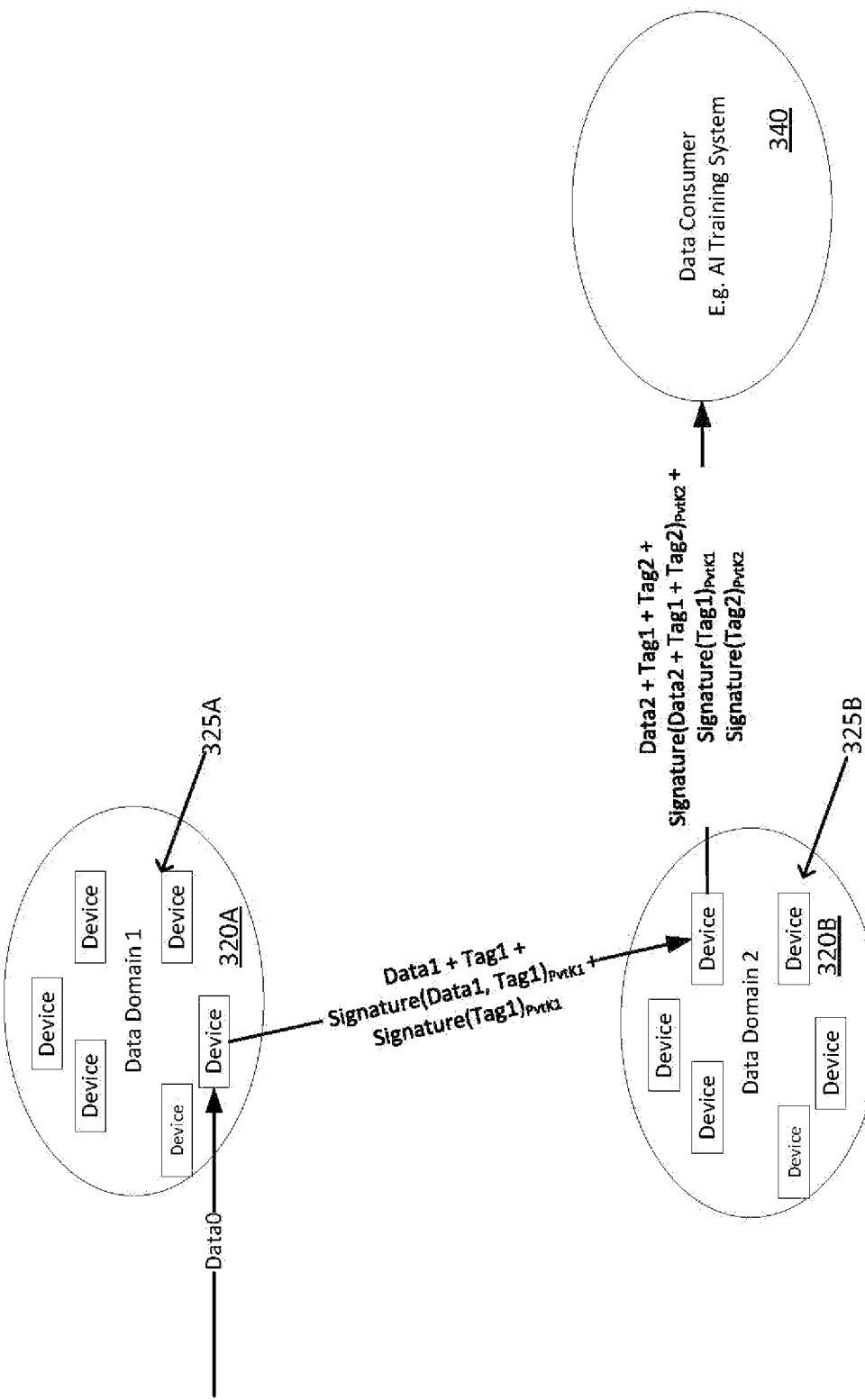
FIG. 3B illustrates an exemplary tagging protocol according to some embodiments.

As illustrated in FIG. 3B, as data (e.g., a data element) is transmitted from the data domain 320A to the data domain 320B, the transmitted data package includes Data1 (e.g., Data0 processed into transformed Data1)+Tag1+Signature (Data1, Tag1)+Signature (Tag1). As shown, both Signature (Data1, Tag1) and Signature (Tag1) are created using the private key (e.g., PvtK1) of the domain member device processing the data element. As discussed above, Data1 and Tag1 are cryptographically signed to be bound together to prevent security attacks.

In the example illustrated in FIG. 3B, one of the domain member devices 325B associated with data domain 320B receives the data package from data domain 320A (e.g., from one of the domain member devices 325A). When the data element Data1 gets processed by the domain member device 325B, Data1 is transformed into Data2, as described herein, a data domain tag, Tag2, is generated and concatenated to Tag1. A signature is created for each of: the data element, Data2, with the appended tags, Tag1, and Tag2. As such, the resulting data package includes Data2 (e.g., Data1 processed into transformed Data2)+Tag1+Tag2+Signature (Data2, Tag1, Tag2)+Signature (Tag1)+Signature (Tag2). As shown, both Signature (Data2, Tag1, Tag2) and Signature (Tag2) are created using the private key (e.g., PvtK2) of the domain member device (e.g., 325B) processing the data element. As discussed above, Data2 and Tag1 and Tag2 are cryptographically signed to be bound together to prevent security attacks. As discussed above relative to detection and verification logic 201, in the example illustrated in FIG. 3B, the detection and verification logic 201 verifies the cryptographic binding between Data1 and Tag1.

Figure 4:
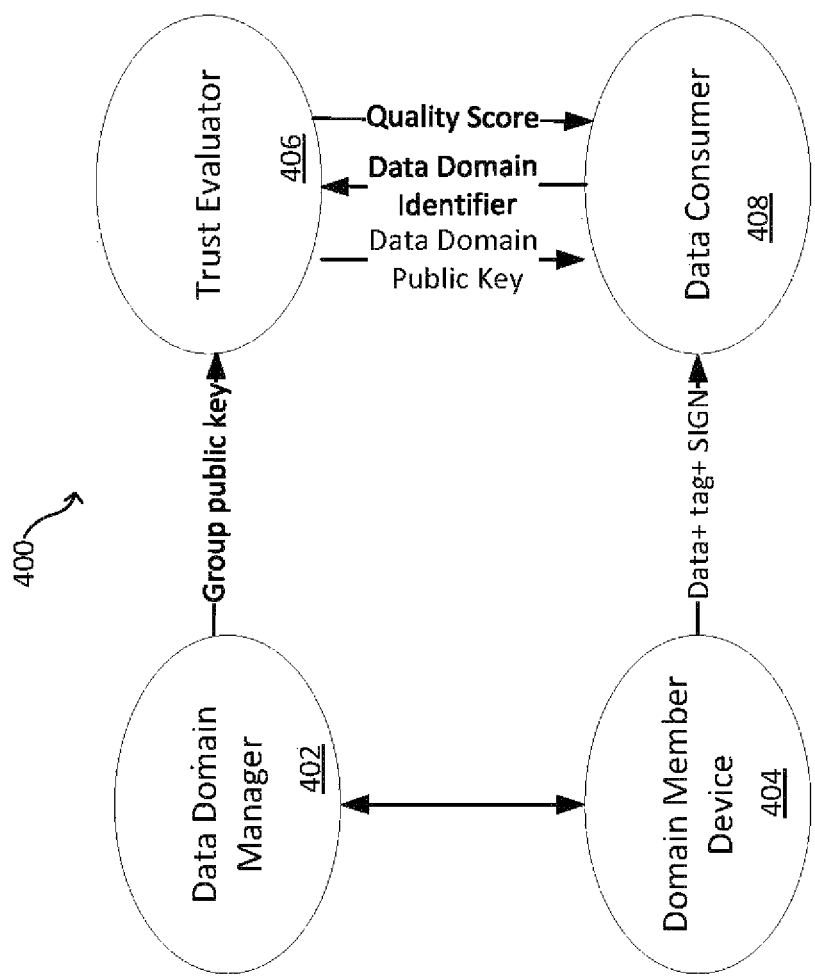
FIG. 4 illustrates an exemplary data quality assessment system for enhancing the trustworthiness of artificial intelligence systems.

As illustrated in FIGS. 3A and 3B, the data package is sent to a data consumer 340. The data consumer 340 may evaluate the data provenance and data movement of the final data element and assess the data quality. With reference now to FIG. 4, a data quality assessment system 400 is shown. The data quality assessment system 400 includes data domain manager 402, domain member device 404, trust evaluator 406, and data consumer 408. As discussed above relative to FIG. 3A, the data domain manager 402 may generate a global public key for its data domain and a private key for each domain member device (e.g., domain member device 404) registered with the corresponding data domain. In one example, the data domain manager 402 may provision the private key into the domain member device 404. In one implementation, the private key may be provisioned statically (e.g., at the time of manufacturing or configuration of the domain member device 404. In another implementation, the private key may be provisioned dynamically (e.g., in the field). When the private key is provisioned dynamically, the domain member device 404 attests itself to the data domain manager 402 before the private key is provisioned into the domain member device 404.

In one example, the data domain manger 402 attests itself to a certificate authority such as VeriSign and obtains a digital certificate that includes the group/global public key of the data domain and data domain identifier artefacts. The data domain manager 402 registers the global public key and information regarding its tag artefact (e.g., data domain identifier) and/or additional information about the data domain with the trust evaluator 406. The additional information about the data domain provided to the trust evaluator 406 may enable the trust evaluator 406 to rate the trust level of the data domain.

The domain member device 404 may include computing units that are part of the data domain. Membership with the data domain is not limited by geographic or topological constraints. In one example, the data domain grouping of domain member devices may be based on common trust properties such as affiliation with a reputable organization and/or devices having security features such as the ability to enforce confidential computing. In one example, the domain member device 404 may have a hardware configuration allowing data tagging to be enabled and disabled. When data tagging is disabled, the domain member device 404 is not part of the data domain and does not perform tagging, as described herein. When data tagging is enabled, the domain member device 404 tags the data with the registered data domain identifier and/or their representations as described herein relative to FIGS. 1-3.

As discussed herein, the final data package is sent to the data consumer 408. The data consumer 408 assesses the data quality based on data provenance and data movement. In one implementation, the data consumer 408 receives the group public key from the trust evaluator 406. The trust evaluator 406 is a trusted repository that stores the registered data domain group/global public keys and information about the data domains such as the data domain identifiers and any additional information (e.g., attributes, properties and characteristics of the data domain) necessary to rank the data domain trustworthiness using a confidence level score. In one example, the trust evaluator 406 uses an intelligent algorithm to determine a confidence level score for each registered data domain and rank the data domains based on the confidence level score.

When the data consumer 408 receives the group public key from the trust evaluator 406, the data consumer 408 verifies the authenticity of the data domain tag using the data domain group public key. For example, the data consumer 408 verifies the integrity of the signed data domain tag itself and verifies cryptographic binding between the data and the data domain tag. When the integrity and authenticity are verified, the data consumer 408 extracts the data domain identifier from the authenticated data domain tag. In one example, the data domain identifier may be in a separate associated container rather than in the data element and/or data feed itself. The data consumer 408 sends the data domain identifier to the trust evaluator 406 to obtain the confidence level score of the data domain identified with the data domain identifier. When the data consumer 408 receives the confidence level score, the data consumer 408 will evaluate the data quality and trustworthiness based on the confidence level score. As discussed herein, the data may pass through one or more domain member devices 325A-325N and/or one or more data domains 320A-320N. As such, in some examples, the final data package may include more than one data domain tag. In this regard, the data consumer 408 may verify the authenticity of each data domain tag included in the final data package, as described herein. The data consumer 408 may obtain a confidence level score for each data domain identified with the data domain identifier included in the data domain tag. The data consumer 408 may determine a confidence level of the data quality by aggregating the confidence level scores for each data domain.

In one example, if the confidence level score is too low the data consumer 408 may discard the data. In one example, if the data in the final data package is received at the data consumer 408 without a data domain tag, the data consumer 408 may associate a low trust level with the data. As such, the accuracy of AI models and systems may be improved by assessing the quality of the data used to train the model, as described herein. A high confidence level score of the data received at the data consumer 408 indicates the data is trustworthy and high-quality data that can be used to accurately train the AI system.

In another implementation, when the data consumer 408 receives the final data package, the data consumer 408 sends the data domain tag and the corresponding signature to the trust evaluator 406. In this example, the trust evaluator 406 verifies the authenticity of the data domain tag using the data domain group public key. For example, the trust evaluator 406 verifies the integrity of the signed data domain tag itself and verifies cryptographic binding between the data and the data domain tag. When the integrity and authenticity is verified, using the data domain identifier that is received in the data domain tag by the trust evaluator 406, the trust evaluator 406 determines the confidence level score of the data domain associated with the data domain identifier. In another example, the trust evaluator 406 identifies the confidence level score of the data domain associated with the data domain identifier. The trust evaluator 406 sends the confidence level score to the data consumer 408. In one example, the trust evaluator 406 may include two different entities. One entity may verify the authenticity of the data domain tag. The other entity may determine the confidence level score that gets sent to the data consumer 408.

It is contemplated that embodiments are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", "programmer", and/or the like.

Communication/compatibility logic 209 may be used to facilitate dynamic communication and compatibility between various components, networks, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, firmware, and/or any combination thereof. In one example, "logic" may refer to or include a software component that works with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

It is contemplated that any number and type of components may be added to and/or removed from tagging mechanism 110 and/or tagging circuitry 120 of FIG. 1 and FIG. 2 to facilitate various embodiments including adding, removing, and/or enhancing certain features. For brevity, clarity, and ease of understanding of tagging mechanism 110 and/or tagging circuitry 120 of FIG. 1 and FIG. 2, many of the standard and/or known components, such as those of a computing device are not shown or discussed here. It is contemplated that embodiments, as described herein, are not limited to any technology, topology, system, architecture, and/or standard and are dynamic enough to adopt and adapt to any future changes.

Figure 5:
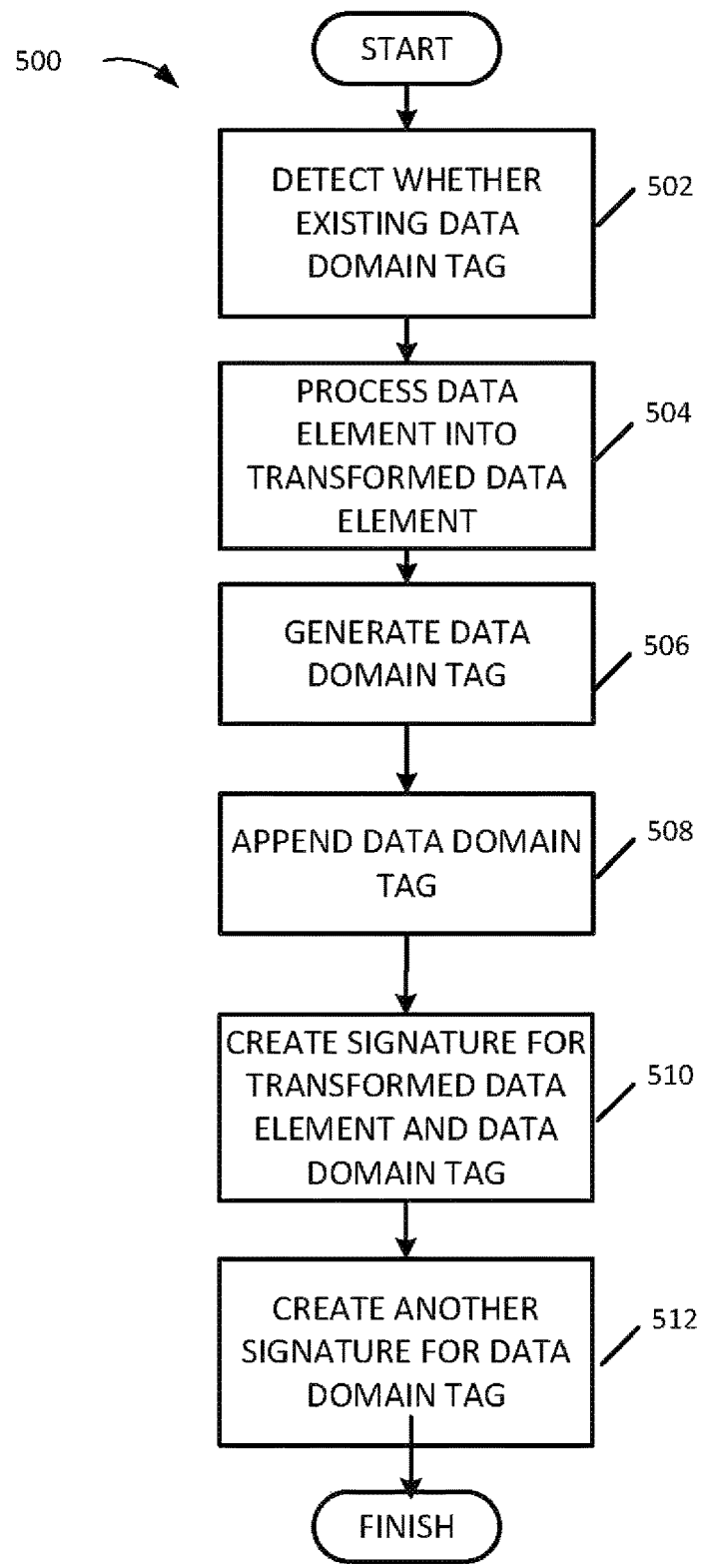
FIG. 5 illustrates a method for a tagging protocol according to some embodiments.

FIG. 5 illustrates a method 500 for a tagging protocol according to some embodiments. Method 500 may be implemented on a computing device or a similar electronic device capable of executing instructions through at least one processor. Process 500 may begin at operation 502, where it is detected whether a data element includes an existing data domain tag. When it is the data element does not include an existing data domain tag, flow proceeds to operation 504, where the data element is processed into a transformed data element. At operation 506, a data domain tag is generated.

In one example, the data domain tag includes at least a data domain identifier and a timestamp. At operation 508, the data domain tag is appended to the transformed data element. At operation 510, a signature is created for the transformed data element and the appended data domain tag using a private key. At operation 512, another signature is created for the data domain tag using the private key.

Figure 6:
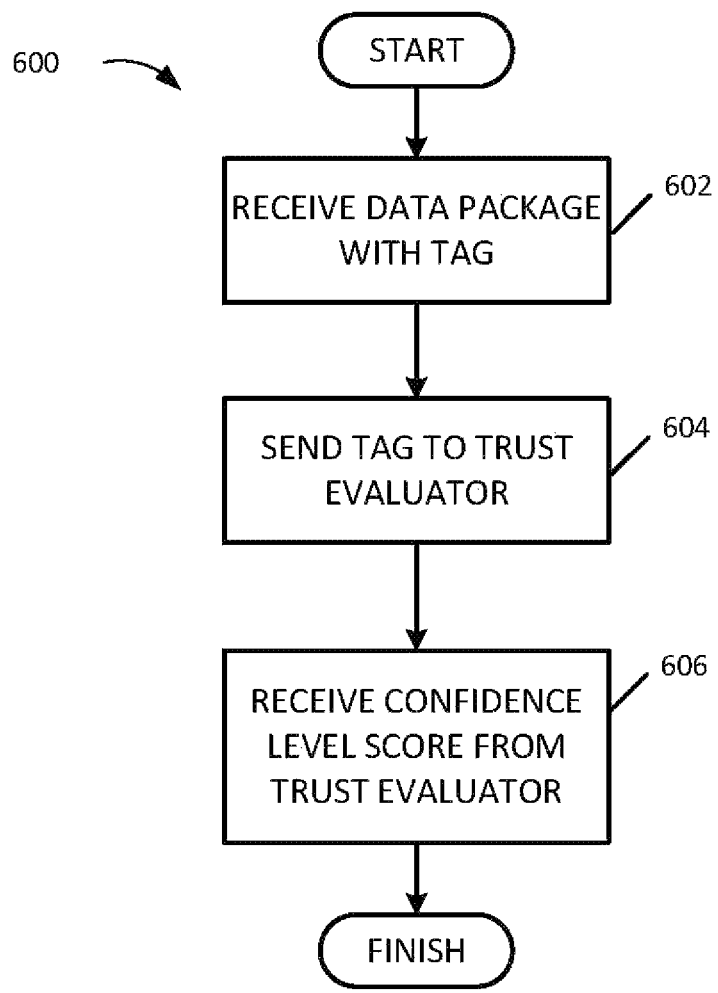
FIG. 6 illustrates a method for data quality assessment according to some embodiments.

FIG. 6 illustrates a method 600 for data quality assessment according to some embodiments. Method 600 may be implemented on a computing device or a similar electronic device capable of executing instructions through at least one processor. Process 600 may begin at operation 602, where a data package is received. In one example, the data package includes at least a data element and at least one data domain tag. The data element and the at least one data domain tag are cryptographically bound with a signature. The at least one data domain tag includes a signature. At operation 604, the data domain tag and the signature are sent to the trust evaluator 406. At operation 606, a confidence level score is received from the trust evaluator 406. The confidence level score may be used to determine the quality of the data.

Figure 7:
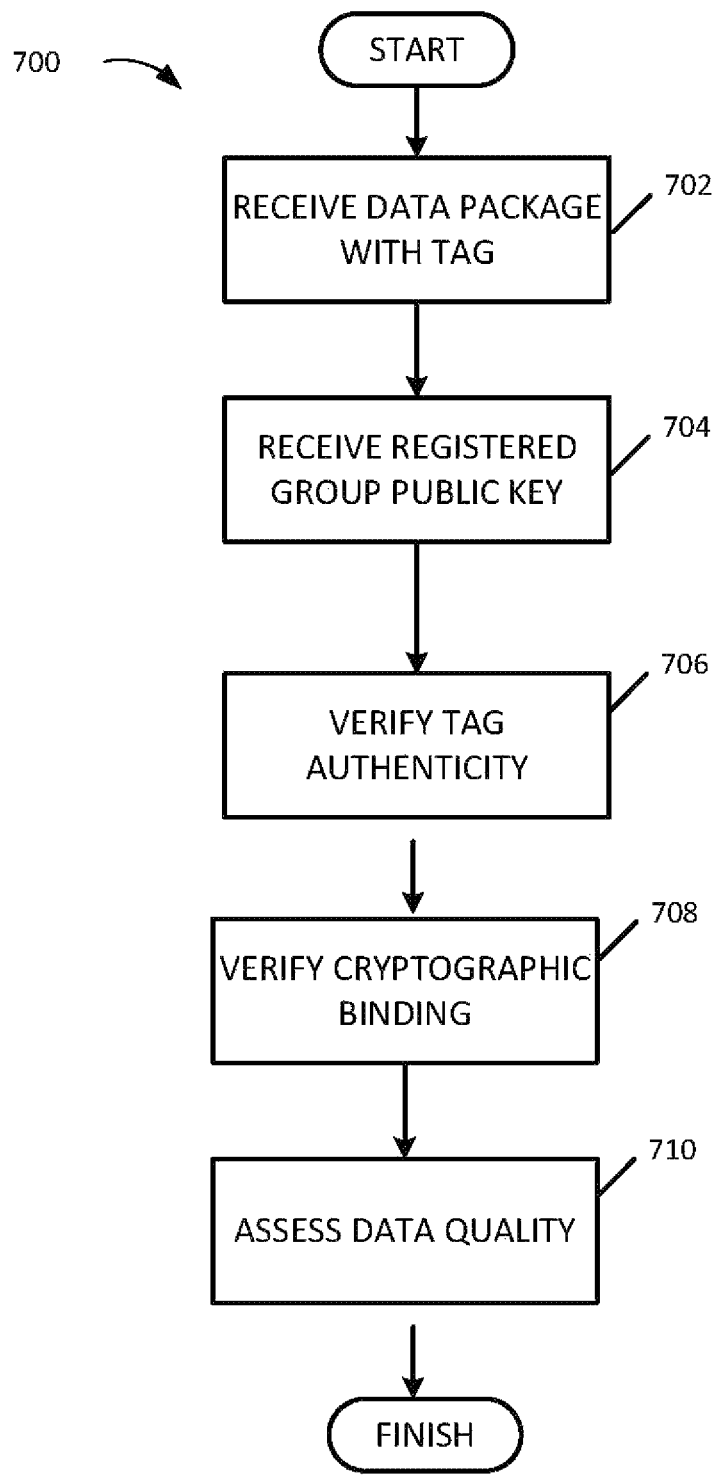
FIG. 7 illustrates a method for data quality assessment according to some embodiments.

FIG. 7 illustrates a method 700 for data quality assessment according to some embodiments. Method 700 may be implemented on a computing device or a similar electronic device capable of executing instructions through at least one processor. Process 700 may begin at operation 702, where a data package including at least a data element and at least one data domain tag is received. The data element and the at least one data domain tag are cryptographically bound with a signature. The at least one data domain tag includes a signature. At operation 704, a registered group public key is received from the trust evaluator 406. At operation 706, the data domain tag authenticity is verified. At operation 708, cryptographic binding of the data element to the at least one data domain tag is verified. At operation 710, data quality is assessed. In one example, assessing the data quality may include extracting a data domain identifier from the at least one data domain tag, sending the data domain identifier to the trust evaluator 406 and receiving a confidence level score for the data domain from which the data element has been processed and/or transformed (e.g., the data domain associated with the data domain identifier).

FIG. 8A is a schematic diagram of an illustrative electronic computing device to enhance the trustworthiness of artificial intelligence processing according to some embodiments. In some embodiments, computing device 800A includes one or more processors 810 including processor cores 818 and tagging circuitry 120. In some embodiments, the computing device 800A includes one or more hardware accelerators 868. In some embodiments, the computing device is to implement processing of software-defined performance monitoring events, as provided in FIGS. 1-7 above.

The computing device 800A may additionally include one or more of the following: cache 862, a graphical processing unit (GPU) 812 (which may be the hardware accelerator in some implementations), a wireless input/output (I/O) interface 820, a wired I/O interface 830, system memory 840, power management circuitry 850, non-transitory storage device 860, and a network interface 870 for connection to a network 872. The following discussion provides a brief, general description of the components forming the illustrative computing device 800A. Example, non-limiting computing devices 800A may include a desktop computing device, blade server device, workstation, laptop computer, mobile phone, tablet computer, personal digital assistant, or similar device or system.

In embodiments, the processor cores 818 are capable of executing machine-readable instruction sets 814, reading data and/or machine-readable instruction sets 814 from one or more storage devices 860 and writing data to the one or more storage devices 860. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 814 may include instructions to implement security processing, as provided in FIGS. 1-7.

The processor cores 818 may include any number of hardwired or configurable circuits, some or all of which may include programmable and/or configurable combinations of electronic components, semiconductor devices, and/or logic elements that are disposed partially or wholly in a PC, server, mobile phone, tablet computer, or other computing system capable of executing processor-readable instructions.

The computing device 800A includes a bus 816 or similar communications link that communicably couples and facilitates the exchange of information and/or data between various system components including the processor cores 818, the cache 862, the graphics processor circuitry 812, one or more wireless I/O interface 820, one or more wired I/O interfaces 830, one or more storage devices 860, and/or one or more network interfaces 870. The computing device 800A may be referred to in the singular herein, but this is not intended to limit the embodiments to a single computing device 800A, since in certain embodiments, there may be more than one computing device 800A that incorporates, includes, or contains any number of communicably coupled, collocated, or remote networked circuits or devices.

The processor cores 818 may include any number, type, or combination of currently available or future developed devices capable of executing machine-readable instruction sets.

The processor cores 818 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 8A are of conventional design. Consequently, such blocks need not be described in further detail herein, as they will be understood by those skilled in the relevant art. The bus 816 that interconnects at least some of the components of the computing device 800A may employ any currently available or future developed serial or parallel bus structures or architectures.

The system memory 840 may include read-only memory ("ROM") 842 and random-access memory ("RAM") 846. A portion of the ROM 842 may be used to store or otherwise retain a basic input/output system ("BIOS") 844. The BIOS 844 provides basic functionality to the computing device 800A, for example by causing the processor cores 818 to load and/or execute one or more machine-readable instruction sets 814. In embodiments, at least some of the one or more machine-readable instruction sets 814 cause at least a portion of the processor cores 818 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 800A may include at least one wireless input/output (I/O) interface 820. The at least one wireless I/O interface 820 may be communicably coupled to one or more physical output devices 822 (tactile devices, video displays, audio output devices, hardcopy output devices, etc.). The at least one wireless I/O interface 820 may communicably couple to one or more physical input devices 824 (pointing devices, touchscreens, keyboards, tactile devices, etc.). The at least one wireless I/O interface 820 may include any currently available or future developed wireless I/O interface. Example wireless I/O interfaces include, but are not limited to: BLUETOOTH®, near field communication (NFC), and similar.

The computing device 800A may include one or more wired input/output (I/O) interfaces 830. The at least one wired I/O interface 830 may be communicably coupled to one or more physical output devices 822 (tactile devices, video displays, audio output devices, hardcopy output devices, etc.). The at least one wired I/O interface 830 may be communicably coupled to one or more physical input devices 824 (pointing devices, touchscreens, keyboards, tactile devices, etc.). The wired I/O interface 830 may include any currently available or future developed I/O interface. Example wired I/O interfaces include but are not limited to universal serial bus (USB), IEEE 1394 ("FireWire"), and similar.

The computing device 800A may include one or more communicably coupled, non-transitory, storage devices 860. The storage devices 860 may include one or more hard disk drives (HDDs) and/or one or more solid-state storage devices (SSDs). The one or more storage devices 860 may include any current or future developed storage appliances, network storage devices, and/or systems. Non-limiting examples of such storage devices 860 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more storage devices 860 may include one or more removable storage devices, such as one or more flash drives, flash memories, flash storage units, or similar appliances or devices capable of communicable coupling to and decoupling from the computing device 800A.

The one or more storage devices 860 may include interfaces or controllers (not shown) communicatively coupling the respective storage device or system to the bus 816. The one or more storage devices 860 may store, retain, or otherwise contain machine-readable instruction sets, data structures, program modules, data stores, databases, logical structures, and/or other data useful to the processor cores 818 and/or graphics processor circuitry 812 and/or one or more applications executed on or by the processor cores 818 and/or graphics processor circuitry 812. In some instances, one or more data storage devices 860 may be communicably coupled to the processor cores 818, for example via the bus 816 or via one or more wired communications interfaces 830 (e.g., Universal Serial Bus or USB); one or more wireless communications interface 820 (e.g., Bluetooth®, Near Field Communication or NFC); and/or one or more network interfaces 870 (IEEE 802.3 or Ethernet, IEEE 802.11, or Wi-Fi®, etc.).

Machine-readable instruction sets 814 and other programs, applications, logic sets, and/or modules may be stored in whole or in part in the system memory 840. Such machine-readable instruction sets 814 may be transferred, in whole or in part, from the one or more storage devices 860. The machine-readable instruction sets 814 may be loaded, stored, or otherwise retained in system memory 840, in whole or in part, during execution by the processor cores 818 and/or graphics processor circuitry 812.

The computing device 800A may include power management circuitry 850 that controls one or more operational aspects of the energy storage device 852. In embodiments, the energy storage device 852 may include one or more primary (i.e., non-rechargeable) or secondary (i.e., rechargeable) batteries or similar energy storage devices. In embodiments, the energy storage device 852 may include one or more supercapacitors or ultracapacitors.

For convenience, the processor cores 818, the graphics processor circuitry 812, the wireless I/O interface 820, the wired I/O interface 830, the storage device 860, and the network interface 870 are illustrated as communicatively coupled to each other via the bus 816, thereby providing connectivity between the above-described components. In alternative embodiments, the above-described components may be communicatively coupled in a different manner than illustrated in FIG. 8A. For example, one or more of the above-described components may be directly coupled to other components, or may be coupled to each other, via one or more intermediary components (not shown). In another example, one or more of the above-described components may be integrated into the processor cores 818 and/or the graphics processor circuitry 812. In some embodiments, all or a portion of the bus 816 may be omitted and the components are coupled directly to each other using suitable wired or wireless connections.

Flow charts representative of example hardware logic, machine readable instructions, hardware implemented state machines, and/or any combination thereof for implementing computing device 800A, for example, are shown in FIGS. 5-7. The machine-readable instructions may be one or more executable programs or portion(s) of an executable program for execution by a computer processor such as the processor 810 shown in the example computing device 800A discussed above in connection with FIG. 8A. The program may be embodied in software stored on a non-transitory computer readable storage medium such as a CD-ROM, a floppy disk, a hard drive, a DVD, a Blu-ray disk, or a memory associated with the processor 810, but the entire program and/or parts thereof could alternatively be executed by a device other than the processor 810 and/or embodied in firmware or dedicated hardware. Further, although the example program is described with reference to the flow charts illustrated in FIG. 4, many other methods of implementing the example computing device 800A may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example methods of FIGS. 5-7 may be implemented using executable instructions (e.g., computer and/or machine-readable instructions) stored on a non-transitory computer and/or machine-readable medium such as a hard disk drive, a solid-state storage device (SSD), a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Figure 8B:
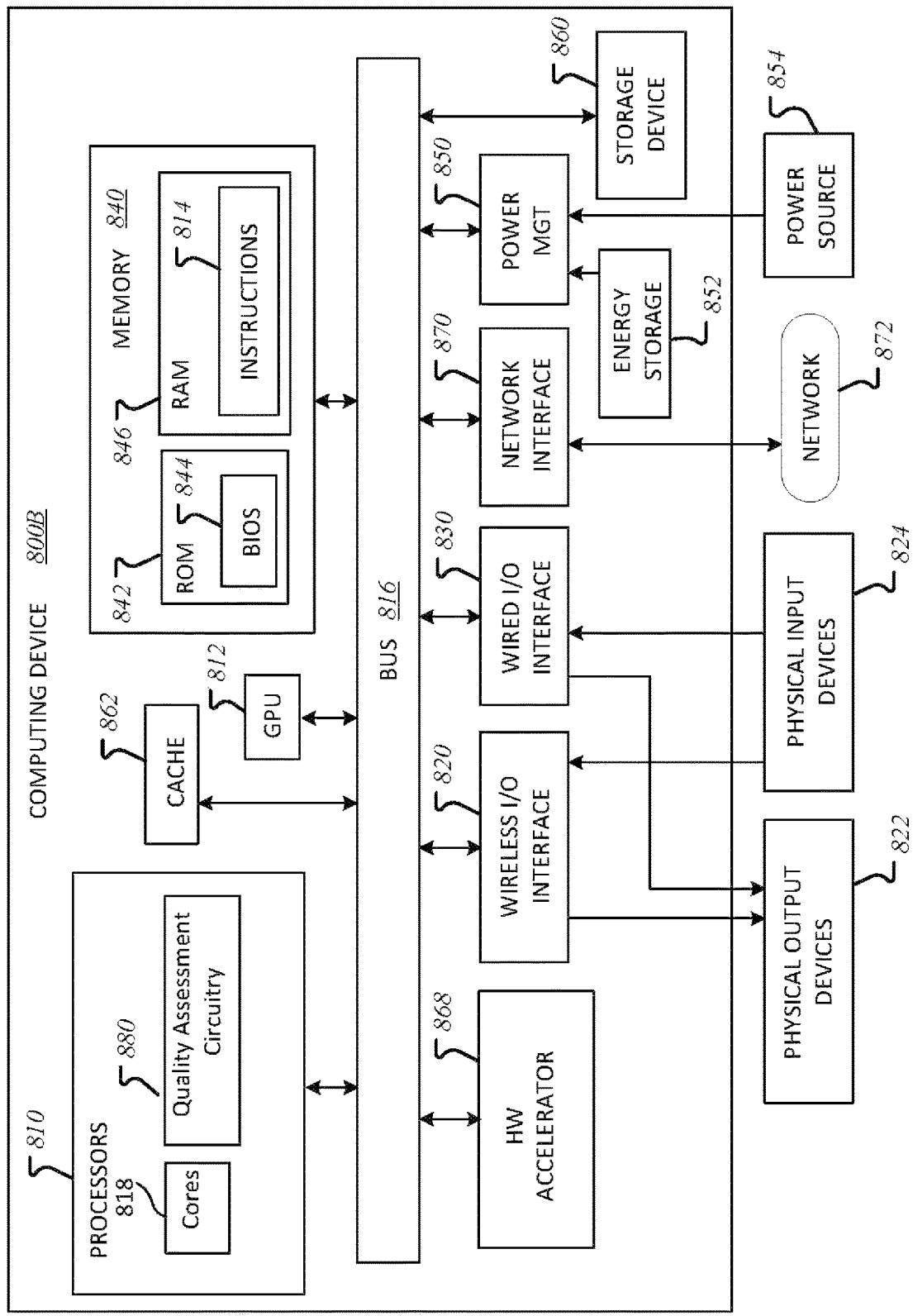
FIG. 8B is a schematic diagram of an illustrative electronic computing device to enhance the trustworthiness of artificial intelligence processing according to some embodiments.

FIG. 8B is a schematic diagram of an illustrative electronic computing device to enhance the trustworthiness of artificial intelligence processing according to some embodiments. In some embodiments, the computing device 800B represents the data consumer (340, 408) as described relative to FIGS. 3A, 3B and FIG. 4 herein. In some embodiments, computing device 800B includes one or more processors 810 including quality assessment circuitry 880.

In some embodiments, the computing device 800B is to implement processing of software-defined performance monitoring events, as provided in FIGS. 1-7 above. The computing device 800B may additionally include the components forming the illustrative computing device 800A described herein relative to FIG. 8A such as one or more of the following: cache 862, a graphical processing unit (GPU) 812 (which may be the hardware accelerator in some implementations), a wireless input/output (I/O) interface 820, a wired I/O interface 830, system memory 840, power management circuitry 850, non-transitory storage device 860, a network interface 870 for connection to a network 872, machine-readable instructions sets 814, one or more storage devices 860, and the like. In this regard, the computing device 800B may include any or all of the non-limiting examples of computing device 800A described relative to FIG. 8A. Additionally, the computing device 800B may perform, execute and/or implement processing of any or all of the functions, methods, processes performed, executed and/or implemented by computing device 800A described relative to FIG. 8A.

Furthermore, the quality assessment circuitry 880 is capable of executing machine-readable instruction sets 814, reading data and/or machine-readable instruction sets 814 from one or more storage devices 860 and writing data to the one or more storage devices 860. In this regard, the quality assessment circuitry 880 may include any or all the functionality of the tagging circuitry 120 described relative to FIG. 8A.

The following examples pertain to further embodiments. Example 1 is a method including detecting whether a data element includes an existing data domain tag, processing the data element into a transformed data element, generating a data domain tag, where the data domain tag includes at least a data domain identifier and a timestamp, appending the data domain tag to the transformed data element, creating a signature for the transformed data element and the appended data domain tag using a private key, and creating another signature for the data domain tag using the private key.

In Example 2, the subject matter of Example 1 can optionally include wherein the private key is associated with a domain member device.

In Example 3, the subject matter of any one of Examples 1-2 can optionally include wherein the domain member device is registered with a data domain.

In Example 4, the subject matter of any one of Examples 1-3 can optionally include wherein the data domain is registered with a trusted repository.

In Example 5, the subject matter of any one of Examples 1-4 can optionally include wherein the data domain is assigned a confidence level score by the trusted repository.

In Example 6, the subject matter of any one of Examples 1-5 can optionally include wherein when the data element includes the existing data domain tag, verifying cryptographic binding between the data element and the existing data domain tag.

In Example 7, the subject matter of any one of Examples 1-6 can optionally include sending a final data package to a data consumer.

Example 8 is at least one non-transitory machine-readable storage medium comprising instructions that, when executed, cause at least one processing device to at least: detect whether a data element includes an existing data domain tag; process the data element into a transformed data element; generate a data domain tag, where the data domain tag includes at least a data domain identifier and a timestamp; append the data domain tag to the transformed data element; create a signature for the transformed data element and the appended data domain tag using a private key; and create another signature for the data domain tag using the private key.

In Example 9, the subject matter of Example 8 can optionally include wherein the private key is associated with a domain member device.

In Example 10, the subject matter of any one of Examples 8-9 can optionally include wherein the domain member device is registered with a data domain.

In Example 11, the subject matter of any one of Examples 8-10 can optionally include wherein the data domain is registered with a trusted repository.

In Example 12, the subject matter of any one of Examples 8-11 can optionally include wherein the data domain is assigned a confidence level score by the trusted repository.

In Example 13, the subject matter of any one of Examples 8-12 can optionally include wherein when the data element includes the existing data domain tag, the instructions that, when executed, further cause the at least one processing device to verify cryptographic binding between the data element and the existing data domain tag.

In Example 14, the subject matter of any one of Examples 8-13 can optionally include wherein the data domain tag includes a tagging scheme that is independent of a data type, a data size, and a data format.

Example 15 is an apparatus comprising: one or more processors to: detect whether a data element includes an existing data domain tag; process the data element into a transformed data element; generate a data domain tag, where the data domain tag includes at least a data domain identifier and a timestamp; append the data domain tag to the transformed data element; create a signature for the transformed data element and the appended data domain tag using a private key; and create another signature for the data domain tag using the private key.

In Example 16, the subject matter of Example 15 can optionally include wherein the private key is associated with a domain member device.

In Example 17, the subject matter of any one of Examples 15-16 can optionally include wherein the domain member device is registered with a data domain.

In Example 18, the subject matter of any one of Examples 15-17 can optionally include wherein the data domain is registered with a trusted repository.

In Example 19, the subject matter of any one of Examples 15-18 can optionally include wherein the data domain is assigned a confidence level score by the trusted repository.

In Example 20, the subject matter of any one of Examples 15-19 can optionally include wherein the data domain includes one or more trust properties.

Example 21 is a system including one or more processors coupled to a memory, wherein the one or more processors are operative to perform the method of any one of Examples 1 to 7.

Example 22 is a method including receiving a data package including at least a data element and at least one data domain tag, sending the at least one data domain tag to a trust evaluator, and receiving a confidence level score from the trust evaluator.

In Example 23, the subject matter of Example 22 can optionally include wherein the at least one data domain tag includes at least a data domain identifier.

In Example 24, the subject matter of any one of Examples 22-23 can optionally include wherein the data element and the at least one data domain tag are cryptographically bound with a signature.

In Example 25, the subject matter of any one of Examples 22-24 can optionally include wherein the at least one data domain tag includes a signature.

In Example 26, the subject matter of any one of Examples 22-25 can optionally include determining a quality of the data element using the confidence level score.

In Example 27, the subject matter of any one of Examples 22-26 can optionally include wherein the confidence level score is associated with a data domain corresponding to the data domain identifier and through which the data element is processed.

Example 28 is a system including one or more processors coupled to a memory, wherein the one or more processors are operative to perform the method of any one of Examples 22 to 27.

Example 29 is an apparatus comprising one or more processors to perform the method of any one of Examples 22 to 27.

Example 30 is at least one non-transitory machine-readable storage medium comprising instructions that, when executed, cause at least one processing device to perform the method of any one of Examples 22 to 27.

Example 31 is a method including receiving a data package including at least a data element and at least one data domain tag, receiving a registered group public key from a trust evaluator, verifying an authenticity of the at least one data domain tag, verifying a cryptographic binding of the data element and the at least one data domain tag, and assessing a quality of the data element.

In Example 32, the subject matter of Example 31 can optionally include wherein the at least one data domain tag includes at least a data domain identifier.

In Example 33, the subject matter of any one of Examples 31-32 can optionally include wherein the data element and the at least one data domain tag are cryptographically bound with a signature.

In Example 34, the subject matter of any one of Examples 31-33 can optionally include wherein the at least one data domain tag includes a signature.

In Example 35, the subject matter of any one of Examples 31-34 can optionally include wherein assessing the quality of the data element includes: extracting the data domain identifier from the at least one data domain tag, sending the data domain identifier to the trust evaluator, and receiving a confidence level score from the trust evaluator.

In Example 36, the subject matter of any one of Examples 31-35 can optionally include wherein the confidence level score is associated with a data domain corresponding to the data domain identifier and through which the data element is processed.

Example 37 is a system including one or more processors coupled to a memory, wherein the one or more processors are operative to perform the method of any one of Examples 31 to 36.

Example 38 is an apparatus comprising one or more processors to perform the method of any one of Examples 31 to 36.

Example 39 is at least one non-transitory machine-readable storage medium comprising instructions that, when executed, cause at least one processing device to perform the method of any one of Examples 31 to 36.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A method comprising:
    detecting whether a first data element includes an existing data domain tag;
    processing the first data element into a transformed data element;
    generating a new data domain tag, where the new data domain tag includes at least a data domain identifier and a timestamp;
    appending the new data domain tag to the transformed data element;
    creating, using a private key, a first signature for the transformed data element and the new data domain tag;
    creating a second signature for the existing data domain tag using the private key; and
    cryptographically binding together, using a new cryptographic binding, at least the transformed data element, the existing data domain tag, and the new data domain tag, wherein the new cryptographic binding is verified at a data consumer of the transformed data element to prevent security attacks.

2. The method of claim 1, wherein the private key is associated with a domain member device.

3. The method of claim 2, wherein the domain member device is registered with a data domain.

4. The method of claim 3, wherein the data domain is registered with a trusted repository.

5. The method of claim 4, wherein the data domain is assigned a confidence level score by the trusted repository.

6. The method of claim 1, further comprising responsive to the first data element including the existing data domain tag, verifying an existing cryptographic binding between the first data element and the existing data domain tag.

7. The method of claim 1, further comprising sending a final data package to a data consumer.

8. At least one non-transitory machine-readable storage medium comprising instructions that, when executed, cause at least one processing device to at least:
    detect whether a first data element includes an existing data domain tag;
    process the first data element into a transformed data element;
    generate a new data domain tag, where the new data domain tag includes at least a data domain identifier and a timestamp;
    append the new data domain tag to the transformed data element;
    create, using a private key, a first signature for the transformed data element and the new data domain tag;
    create a second signature for the new data domain tag using the private key; and
    cryptographically bind together, using a new cryptographic binding, at least the transformed data element, the existing data domain tag, and the new data domain tag, wherein the new cryptographic binding is verified at a data consumer of the transformed data element to prevent security attacks.

9. The at least one non-transitory machine-readable storage medium of claim 8, wherein the private key is associated with a domain member device.

10. The at least one non-transitory machine-readable storage medium of claim 9, wherein the domain member device is registered with a data domain.

11. The at least one non-transitory machine-readable storage medium of claim 10, wherein the data domain is registered with a trusted repository.

12. The at least one non-transitory machine-readable storage medium of claim 11, wherein the data domain is assigned a confidence level score by the trusted repository.

13. The at least one non-transitory machine-readable storage medium of claim 8, wherein responsive to the first data element including the existing data domain tag, the instructions, when executed, further cause the at least one processing device to verify an existing cryptographic binding between the first data element and the existing data domain tag.

14. The at least one non-transitory machine-readable storage medium of claim 10, wherein the existing data domain tag and the new data domain tag include a tagging scheme that is independent of a data type, a data size, and a data format.

15. An apparatus comprising:
    one or more processors to:
        detect whether a first data element includes an existing data domain tag;
        process the first data element into a transformed data element;
        generate a new data domain tag, where the new data domain tag includes at least a data domain identifier and a timestamp;
        append the new data domain tag to the transformed data element;
        create, using a private key, a first signature for the transformed data element and the new data domain tag;
        create a second signature for the new data domain tag using the private key; and
    cryptographically bind together, using a new cryptographic binding, at least the transformed data element, the existing data domain tag, and the new data domain tag, wherein the new cryptographic binding is verified at a data consumer of the transformed data element to prevent security attacks.

16. The apparatus of claim 15, wherein the private key is associated with a domain member device.

17. The apparatus of claim 16, wherein the domain member device is registered with a data domain.

18. The apparatus of claim 17, wherein the data domain is registered with a trusted repository.

19. The apparatus of claim 18, wherein the data domain is assigned a confidence level score by the trusted repository.

20. The apparatus of claim 17, wherein the data domain includes one or more trust properties.

* * * * *